(12) United States Patent
Johnson et al.

(10) Patent No.: US 8,057,144 B2
(45) Date of Patent: Nov. 15, 2011

(54) SEALED, BLIND FASTENER ASSEMBLY

(75) Inventors: Timothy H. Johnson, Seattle, WA (US);
Leonard F. Reid, Issaquah, WA (US);
Bruce F. Gibson, Bellevue, WA (US)

(73) Assignee: Fatigue Technology, Inc., Seattle, WA (US)

( * ) Notice: Subject to any disclaimer, the term of this patent is extended or adjusted under 35 U.S.C. 154(b) by 1047 days.

(21) Appl. No.: 10/928,641

(22) Filed: Aug. 27, 2004

(65) Prior Publication Data
US 2006/0045649 A1 Mar. 2, 2006

(51) Int. Cl.
*F16B 13/04* (2006.01)

(52) U.S. Cl. ............... 411/34; 411/429; 411/372.5

(58) Field of Classification Search ............... 411/38, 411/82, 82.1, 370, 371.1, 431, 34, 429–430, 411/372.5
See application file for complete search history.

(56) References Cited

U.S. PATENT DOCUMENTS

| | | | | |
|---|---|---|---|---|
| 1,994,210 A | * | 3/1935 | Chobert | 29/507 |
| 2,188,422 A | * | 1/1940 | Waner | 411/34 |
| 2,324,142 A | | 7/1943 | Eklund | 10/27 |
| 2,409,352 A | | 10/1946 | Gill | 85/40 |
| 2,562,019 A | | 7/1951 | Colley | 85/40 |
| 2,763,314 A | | 9/1956 | Gill | 151/41.72 |
| 2,884,099 A | * | 4/1959 | Nenzell | 411/548 |
| 2,914,106 A | | 11/1959 | Boyd | 151/21 |
| 3,085,463 A | | 4/1963 | Hallock | 85/40 |
| 3,136,203 A | * | 6/1964 | Davis | 411/38 |
| 3,145,751 A | * | 8/1964 | Boots | 411/282 |
| 3,181,338 A | | 5/1965 | Zetterlund | 72/391 |
| 3,215,026 A | | 11/1965 | Davis | 85/70 |
| 3,348,444 A | | 10/1967 | Brignola | 85/70 |
| 3,443,473 A | | 5/1969 | Tritt | 85/70 |
| 3,461,771 A | | 8/1969 | Briles | 85/70 |
| 3,685,391 A | * | 8/1972 | Gapp et al. | 411/70 |
| 4,007,659 A | | 2/1977 | Stencel | 85/70 |
| 4,018,133 A | * | 4/1977 | Chaivre et al. | 411/429 |
| 4,499,647 A | | 2/1985 | Sakamura et al. | 29/509 |
| 4,639,175 A | | 1/1987 | Wollar | 411/38 |
| 4,669,937 A | * | 6/1987 | Feldman | 411/429 |
| 4,726,723 A | * | 2/1988 | Bainbridge | 411/432 |
| 4,764,070 A | * | 8/1988 | Baltzell et al. | 411/430 |
| 4,775,272 A | * | 10/1988 | Toth | 411/429 |

(Continued)

OTHER PUBLICATIONS

RIVNUT®, retrieved May 12, 2004, from http://www.bollhoff-rivnut.com/id27_m.htm, 1 page.

(Continued)

*Primary Examiner* — Victor Batson
(74) *Attorney, Agent, or Firm* — Seed Intellectual Property Law Group PLLC

(57) ABSTRACT

A sealed attachment fastener assembly with a receiving member and a cap that can be inserted into an opening in a work piece and fixed therein from only one side of the work piece. A portion of the fastener assembly on the blind side of the work piece is collapsible into a flange. In addition, another portion of the fastener assembly is contemporaneously radially expandable within the opening of the work piece to at least rotationally secure the fastener assembly with respect to the work piece. The radial expansion will result in a high interference fit of the fastener in the work piece, which may enhance the fatigue of the installation. A cap completes the fastener assembly to substantially prevent fluid from leaking through the fastener assembly opening. The cap can be assembled with the receiving member after the internal threads within the receiving member have been machined.

28 Claims, 3 Drawing Sheets

U.S. PATENT DOCUMENTS

| | | | |
|---|---|---|---|
| 4,813,835 A * | 3/1989 | Toth | 411/429 |
| 4,826,372 A * | 5/1989 | Kendall | 411/43 |
| 4,828,438 A * | 5/1989 | Shackelford | 411/34 |
| 4,875,815 A | 10/1989 | Phillips, II | 411/38 |
| 4,955,773 A * | 9/1990 | Toth | 411/429 |
| 5,051,048 A | 9/1991 | Maddox | 411/34 |
| 5,135,340 A | 8/1992 | Stinson | 411/34 |
| 5,294,223 A | 3/1994 | Phillips, II | 411/34 |
| 5,634,751 A | 6/1997 | Stencel et al. | 411/43 |
| 5,752,795 A | 5/1998 | D'Adamo | 411/429 |
| 5,810,530 A * | 9/1998 | Travis | 411/34 |
| 5,815,906 A | 10/1998 | Johnsen | 29/524.1 |
| 6,004,086 A | 12/1999 | Gand et al. | 411/38 |
| 6,224,309 B1 | 5/2001 | Yamamoto | 411/11 |
| 6,487,767 B1 * | 12/2002 | Reid et al. | 29/522.1 |
| 6,792,657 B2 | 9/2004 | Reid et al. | 29/243.522 |
| 6,868,757 B2 | 3/2005 | Hufnagl et al. | 81/55 |
| 6,935,821 B2 | 8/2005 | Bodin et al. | 411/29 |
| 6,957,939 B2 * | 10/2005 | Wilson | 411/431 |
| 6,990,722 B2 * | 1/2006 | Reid et al. | 29/522.1 |
| 2004/0033119 A1 | 2/2004 | Hufnagl et al. | 411/34 |
| 2006/0045649 A1 * | 3/2006 | Johnson et al. | 411/38 |
| 2006/0078399 A1 * | 4/2006 | Coddington et al. | 411/38 |

OTHER PUBLICATIONS

International Organization for Standardization, "Aerospace—Nuts, self-locking, with maximum operating temperature less than or equal to 425° C.—Procurement specification," *ISO 5858—Second Edition*, pp. 1-26, 1999.

Hi-Shear Corporation, "Blind Nut® (BN) and Blind Bolt® (BB)," retrieved Sep. 14, 2004, from http://www.hi-shear.com/fastener_bn-bb_stds.htm, 3 pages.

Hi-Shear Corporation, "Hi-Lok® Fastening System (HL)," retrieved Sep. 7, 2004, from http://www.hi-shear.com/fastener_hl_stds.htm, 4 pages.

Hi-Shear Corporation, "Hi-Lok® Fastening System (HL)," retrieved Sep. 7, 2004, from http://www.hi-shear.com/fastener_hl.htm, 3 pages.

* cited by examiner

SEALED, BLIND FASTENER ASSEMBLY

BACKGROUND OF THE INVENTION

1. Field of the Invention

This disclosure relates to a sealed, blind, internally threaded fastener assembly that is cold expanded and at least partially collapsible to form a secure fit within a work piece.

2. Description of the Related Art

The ability to blindly install a fastener into structural work members is well known in the art, particularly in the aerospace industry. As used herein, a blind fastener comprises the nut or receiving portion of a bolt/nut fastener group. Blind fasteners are often used for access panels and other structure where it is difficult or nearly impossible to get a tool onto the back or "blind" side of the panel to hold a nut. Thus the blind fastener, once installed, performs like a nut to receive an attachment bolt so that other structure or accessory devices can be attached to the work piece or access panel, for example. A blind fastener, sometimes referred to as a blind rivet, is typically a cylindrically shaped device with an internally threaded passage.

The blind fastener or rivet is installed into an opening in a work piece from an access side of the work piece. Blind fasteners are typically provided with an integrally formed closed end and internal threads machined within a partial opening in the fastener body. The blind fastener can have a first flange or a head on one end for seating the blind fastener against the access side of the work piece and for helping to axially restrain the blind fastener with respect to the work piece. The opposite end of the blind fastener, which is inserted through the opening in the work piece, is configured with internal threads. The internal threads permit the blind fastener to be attached to an installation tool during installation of the blind fastener and further permits an attachment or accessory bolt to be threaded into the blind fastener when, for example, an accessory device is mounted to the work piece.

A typical installation tool used to install a blind fastener has a threaded rod coupled to the tool. The tool is operated to pull on the rod, thus causing a portion of the blind fastener located on the blind or inaccessible side of the work piece to collapse and form a second flange. The second flange, formed on the blind side of the work piece works in conjunction with the head of the blind fastener to axially secure the blind fastener within the work piece (e.g., axial with respect to the longitudinal axis of the blind fastener). Blind fasteners or rivets of the type just described are currently provided by Bollhoff Rivnut company, with headquarters in Bielefeld, Germany under their RIVNUT® brand of fasteners.

To enhance the fatigue life of the surrounding work piece, and/or to rotationally secure the blind fastener with respect to the work piece, at least a portion of the blind fastener can be radially and plastically expanded into the work piece during installation. Methods and tools that can be used to install blind fasteners or rivets are described in detail in U.S. Pat. No. 6,487,767 issued to Reid et al. on Dec. 3, 2002. The radial expansion process helps to prevent the blind fastener from rotating or "torquing out" when torque is applied to a screw or bolt mounted in the blind fastener. Thus, the blind fastener remains torsionally static while the accessory bolt or screw is tightened to its requisite design torque or is removed from the blind fastener.

As mentioned, blind fasteners are typically manufactured with a fastener body having an integrally formed closed end. Internal threads are machined within a partial opening in the fastener body. During the machining of the internal threads, metal shavings and other debris can become trapped between the valleys of the threads and accumulate in the region of the closed end. Therefore, the internally threaded region must be cleaned out and at least a majority of the debris removed. One drawback of presently designed blind fasteners is that the integrally formed closed end of the blind fastener prevents the removal of the majority of debris residing in the blind fastener opening after machining. The failure or inability to remove a substantial amount of debris from the threaded region of the blind fastener can cause stress concentration sites in the thread roots, for example, and lead to premature fracturing of the bolt or the blind fastener while the blind fastener is under an operational load. In addition, debris can interfere with the proper threading of an accessory bolt or screw that is inserted into the blind fastener. Debris also causes additional friction between the internal threads of the blind fastener and the threads of the accessory bolt or screw. Increased friction between threaded members can be detrimental to achieving the proper amount of bolt preload. When the preload of a bolt is too low, the accessory device attached via the bolt may vibrate and become loose and/or the bolt would have to carry a larger share of the operational loads, thus reducing the fatigue life of the bolt and possibly leading to premature bolt failure.

One application where blind fasteners can be used is in a so-called "wet" environment, for example, in the structural wall of an airplane fuel tank. Presently, blind fasteners with integrally machined closed ends are used. However, blind fasteners with integrally machined closed ends, referred to as "one-piece blind fasteners," tend to be costly, tend to be heavy, can be difficult to quality check, and have internal threads that are difficult to clean sufficiently. Another drawback with a one-piece blind fastener is that excessive material is required to allow a sufficient threading depth within the partial opening of the fastener body, this it is often difficult to meet the design requirements for thread runout, etc. Therefore, a low-cost, inspectable, lighter weight, and easier to clean blind fastener that can be used in a wet environment is desirable.

SUMMARY OF THE INVENTION

In one aspect, a sealable blind fastener assembly includes a receiving member having a body with a first end and a second end opposed to the first end, the body having a first outer perimeter and a second outer perimeter smaller than the first out perimeter, the body having an opening extending between the first end and the second end and an engageable strucuture formed therein, at least a portion of the body being collapsible to form a flange, at least a portion of the body with at least a first outer perimeter being sufficiently malleable to undergo some amount of plastic, radial expansion; and a cap having an open end and a closed end connected with a thin-walled body, a first portion of the cap having at least a first inner perimeter sized to be closely received by the second perimeter of the body of the receiving member, the cap forming a secure fit with the body of the receiving member.

In another aspect, a fastener assembly includes a body having a first end and a second end opposed to the first end, a passage extending through the body, the passage forming an opening at the first end and an opening at the second end of the body, the body having a first section and a second section between the first end and the second end, the first section being generally located between the first end and the second section and having a first outer perimeter, the second section being generally located between the first section and the second end and having a second outer perimeter, the second outer perimeter being smaller than the first outer perimeter, the body further having a collapsible wall portion spaced from the first end by a distance approximately equal to at least a thickness of a work piece into which the fastener assembly is to be mounted; and a cap having a first end and a second end, opposed to the first end, the cap having an opening formed at the first end and being closed at the second end, an inner perimeter of the opening being sized to be closely received by the second outer perimeter of the body.

In yet another aspect, a method for manufacturing a blind, collapsible fastener assembly, the blind, collapsible fastener assembly comprising a receiving member and a cap, the method includes providing a receiving member having an internal passageway extending therethrough, the internal passageway being open at a first end and a second end thereof, the receiving member having a first flange formed proximate the first end; forming a collapsible wall portion of the receiving member that will collapse when subjected to a predetermined amount of applied force to form a second flange; machining internal threads in at least a portion of the internal passageway proximate to the second end of the internal passageway of the receiving member; cleaning the internal threads of the receiving member; and attaching the cap to the receiving member to close off the second end of the receiving member from an environment after cleaning the internal threads.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with fastening systems, installation aspects of blind, partially collapsible fastener assemblies, and various types of tooling used to install the blind, partially collapsible fastener assemblies have not been shown or described in detail to avoid unnecessarily obscuring descriptions of the embodiments of the invention.

Unless the context requires otherwise, throughout the specification and claims which follow, the Word "comprise" and variations thereof, such as, "comprises" and "comprising" are to be construed in an open, inclusive sense, that is as "including, but not limited to."

Throughout the disclosure, reference to a blind fastener or blind fastener assembly relates to a nut or bolt receiving member with internal threads. The reference to assembly provides that the nut or bolt receiving member is structurally comprised of more than a one-piece.

The headings provided herein are for convenience only and do not interpret the scope or meaning of the claimed invention.

Assembled, Sealed, Blind Fastener Assembly With Cap Included

Figure 1:
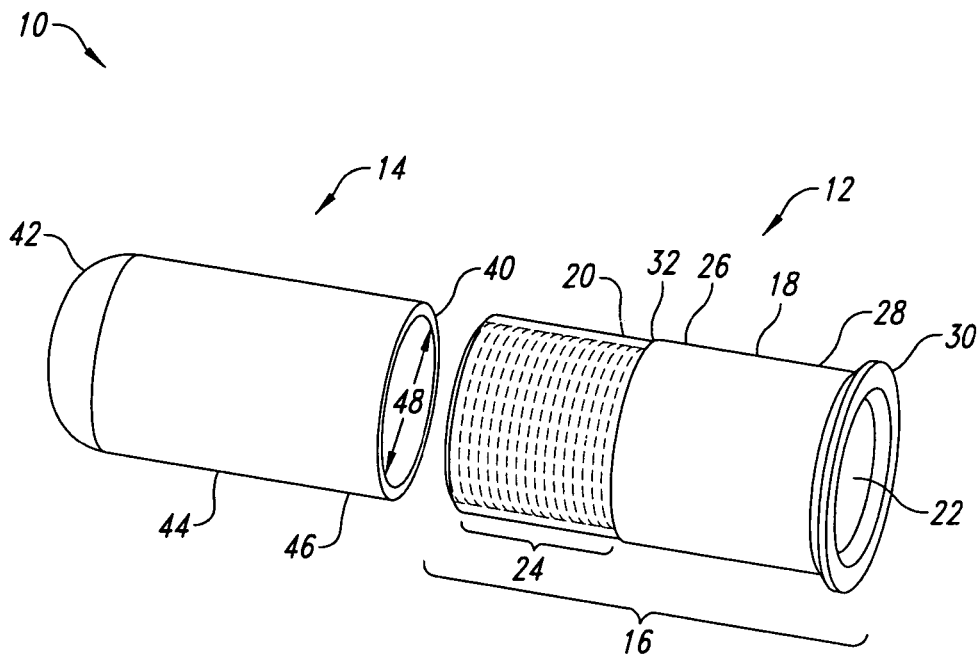
FIG. 1 is a front, right, exploded isometric view of a sealed, blind fastener assembly according to one illustrated embodiment of the invention.
Figure 2:
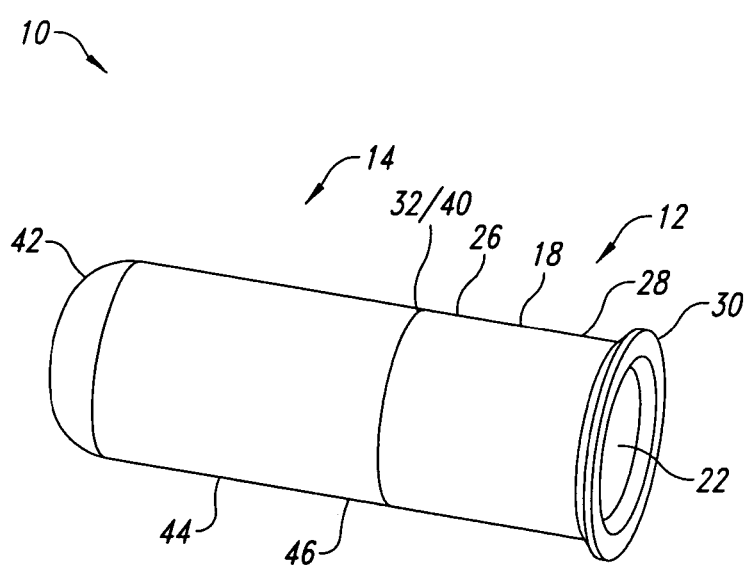
FIG. 2 is a front, right, isometric view of an assembled version of the sealed, blind fastener assembly of FIG. 1.
Figure 3:
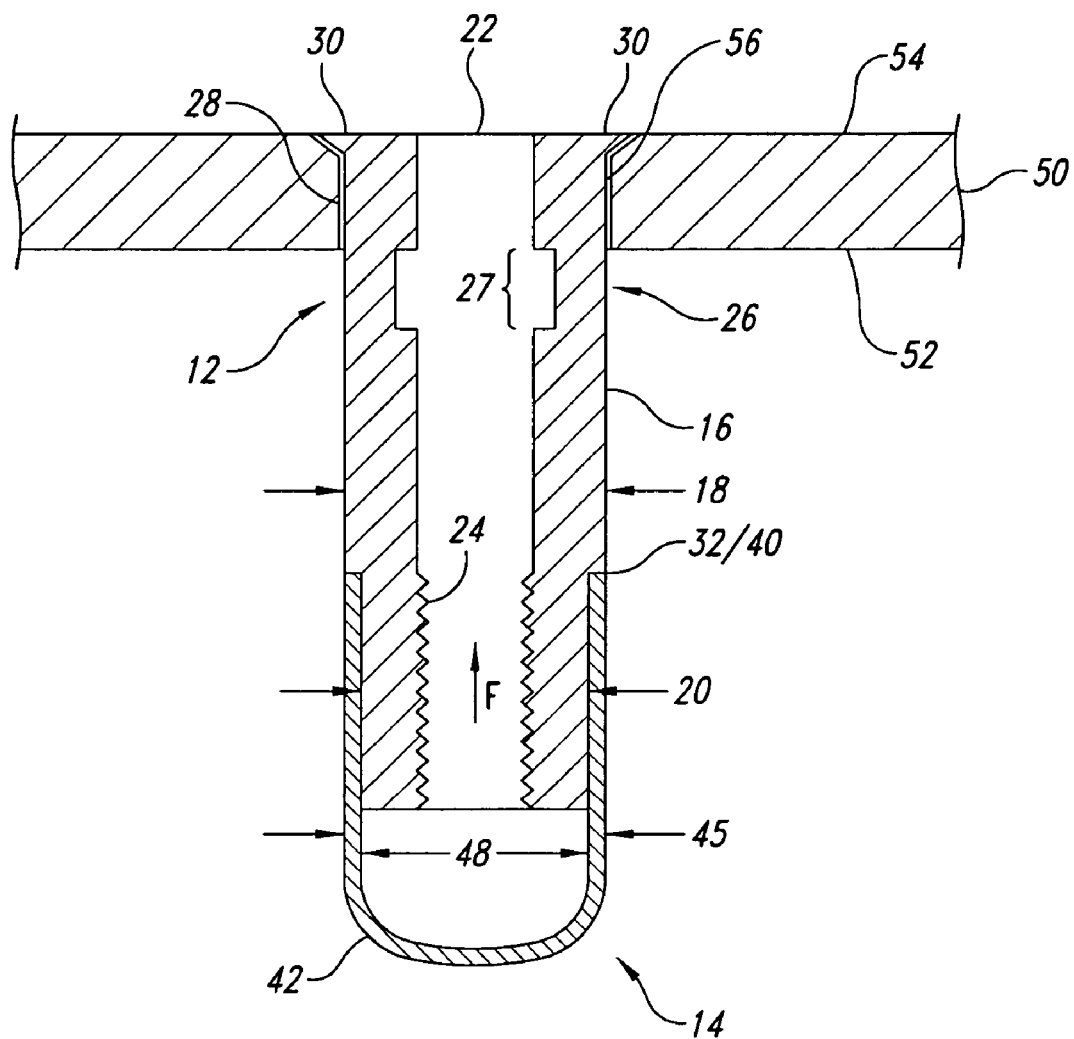
FIG. 3 is a cross sectional view of the sealed, blind fastener assembly of FIG. 1 inserted in a work piece prior to being fixed in a work piece.

FIGS. 1 through 3 show a sealed, blind fastener assembly 10 according to one illustrated embodiment of the present invention. The fastener assembly 10 is comprised primarily of a receiving member 12 and a cap 14.

The receiving member 12 has a passage 22, which extends through the body 16 providing that both ends of the receiving member 12 are open. The passage 22 permits the receiving member 12 to receive an engagement portion of an installation tool. Specific details of installing the fastener assembly 10 into an opening in a work piece are discussed below and can also be found in U.S. Pat. No. 6,487,767 issued to Reid et al. on Dec. 3, 2002. In addition, the passage 22 permits the accessory bolt or screw to be inserted into the fastener assembly 10 when an accessory device is to be mounted to the work piece.

The receiving member 12 includes an internal engagement section, which is distally located from the head end 30 of the fastener assembly 10. In the illustrated embodiment, machined threads 24 (illustrated in hidden line form in FIG. 1) form the internal engagement section. The machined threads 24 provide the means for permitting the fastener assembly 10 to selectively and detachably engage the engagement portion of the rod of the installation tool. In addition, the machined threads 24 provide the means for receiving the externally threaded portion of the accessory bolt or screw.

The cap 14 is attached to one end of the receiving member 12. The cap 14 closes off and can also seal the one end of the passage 22. As illustrated in FIG. 1, the cap 14 includes an open end 40 and a closed end 42 connected by a thin-walled body 44.

The fastener assembly member 12 and the cap 14 both have perimeters that are configured to cooperate with one another to allow the fastener assembly 10 to be adequately received by the work piece 50. The body 16 of the receiving member 12 has a first outer perimeter 18 and a second outer perimeter 20. A step or shoulder 32 connects the first outer perimeter 18 and the second outer perimeter 20. The first outer perimeter 18 is sized to be closely received by the opening in the work piece 50. The close fit ensures that a radially expandable portion 28 of the body 16 will not be deformed too far beyond its elastic limit when the installation tool operates on the portion on the fastener assembly 10.

With particular reference to FIG. 2, a second outer perimeter 20 of the receiving member 12 is illustrated as coupled with a first portion 46 of the cap 14. The first portion 46 of the cap 14 has a first inner perimeter 48 sized to at least receive the second outer perimeter 20 of the receiving member 12. The second outer perimeter 20 and the first inner perimeter 48 of the cap 14 can be coupled by press fitting the cap 14 onto the second outer perimeter 20, simply guiding and bonding the cap 14 onto the second perimeter 20, threading the cap 14 onto the second perimeter 20, or attaching the cap 14 in some other mechanical fashion. Whichever method is used to attach the cap 14 to the receiving member 12, a sealant (not shown) can also be used at an interface 20/48 of the cap 14 and the receiving member 12 to protect against fluid leakage from the blind side 52 to the accessible side 54 of the work piece 50

(FIG. 3). In one embodiment, where the fastener assembly 10 is installed in a "wet" fuel tank environment, the tight fit between the cap 14 and the receiving member 12 in combination with the sealant is sufficient to adequately prevent fuel leakage through the passage 22 of the receiving member 12.

With particular reference now shifting to FIG. 3, insertion of the fastener assembly 10 (i.e., receiving member 12 and cap 14) into the opening in the work piece 50 requires that the cap outer perimeter 45 be sized to be only slightly larger, equal to, approximately equal to, or smaller than, but not substantially larger than the first outer perimeter 18 of the body 16. Matching the cap outer perimeter 45 with the first outer perimeter 18 allows the cap 14 of the fastener assembly 10 to be inserted through the opening in the work piece 50 during installation of the fastener assembly 10 in the work piece 50. Recall that the cap 14 is assembled with the receiving member 12 before the fastener assembly 10 is inserted into the opening in the work piece 50. One skilled in the art will appreciate and understand that both the cap 14 and the opening in the work piece 50 are subject to tolerance variances and although it is preferable that the cap outer perimeter 45 be equal to or smaller than the first outer perimeter 18 of the body 16, the cap outer perimeter 45 may be slightly larger than the first outer perimeter 18 of the body 16 without detrimentally affecting the installation of the fastener assembly 10 in the opening of the work piece 50.

Therefore, in the illustrated embodiment of FIG. 3, the second outer perimeter 20 of the receiving member 12 is sized to be at least slightly smaller than the first outer perimeter 18. Reducing the size of the second outer perimeter 20 permits the cap 14 to be received onto the receiving member 12 while also allowing the cap outer perimeter 45 and the first outer perimeter 18 to be matched up as discussed above. A step or shoulder 32 connects the first outer perimeter 18 with the second outer perimeter 20. The shoulder 32 provides an enhanced sealing interface between the cap end 40 and the receiving member 12. In addition, the shoulder 32 provides a stop for the cap end 40. The stop permits mass produced caps 14 to be repeatedly placed onto the receiving members 12 to a standard depth. The terminus of caps 14 are generally located within a distance of approximately 0.020 inches of the shoulder 32. Thus, in such an embodiment, the cap 14 does not necessarily seat against the shoulder 32. Whether seated against the shoulder 32 or not, the cap 14 can be sealed with the receiving member 12 with an adhesive-type sealer, for example a LOCKTITE® sealant supplied by the 3M Corporation.

Installation of the Sealed, Blind Fastener Assembly into a Work Piece

The installation of the fastener assembly 10 into the opening in the work piece 50 is accomplished with an installation tool. The discussion herein regarding the tool and the method of installation is kept brief because the specifics and details can be found in U.S. Pat. No. 6,487,767 issued to Reid et al. on Dec. 3, 2002.

Figure 4:
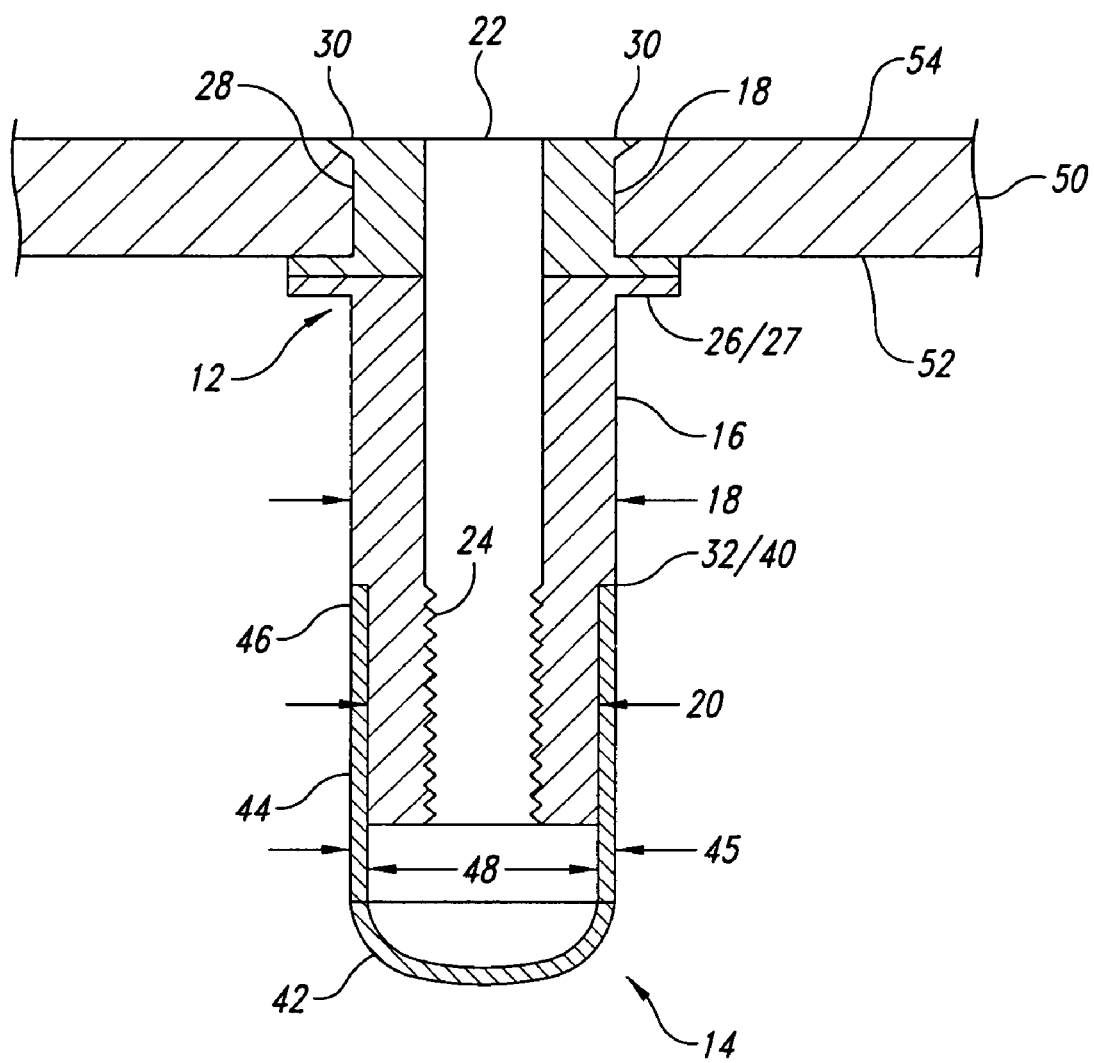
FIG. 4 is a cross sectional view of the sealed, blind fastener assembly of FIG. 1 fixed in a work piece.

In discussing the installation of the fastener assembly 10, FIGS. 3 and 4 will be referenced accordingly. The fastener assembly 10 is installed into the opening in the work piece 50 with an installation tool comprised of at least a tool housing, a threaded engagement rod, and a mandrel. The threaded engagement rod cooperates with the mandrel to collapse or buckle a collapsible portion 26 of the body 16 onto the blind side 52 of the work piece 50. The collapsing process secures, or at least restrains, the fastener assembly 10 within the work piece 50. The threaded engagement rod further cooperates with the mandrel to force the mandrel into the passage 22 to radially expand the radially expandable portion 28. The radial expansion of the portion 28, after expansion, establishes a secure, interference fit between the portion 28 and the opening in the work piece 50, which further imposes a rotational restraint on the fastener assembly 10 with respect to the work piece 50.

FIG. 3 illustrates the fastener assembly 10 in the work piece 50 prior to the buckling of the collapsible portion 26 and prior to the radial expansion of the portion 28. The collapsible portion 26 may take the form of a reduced thickness wall portion 27 that is designed to buckle or collapse when the threaded engagement rod exerts an axial pulling force "F" on the internal threads 24 of the receiving member 12 while the head 30 of the fastener assembly member 12 is kept in contact with the work piece 50.

FIG. 4 shows the collapsible portion 26 in a collapsed state, forming a second head or flange 27 on the blind side 52 of the work piece 50. The second flange 27 works in combination with the head 30 to create a clamping force on the work piece 50. This helps to secure the fastener assembly 10 in an axial direction. During the installation process, the portion 28 is radially expanded into the work piece 50 contemporaneously or coincidently with the buckling of the collapsible portion 26, thus establishing a high interference fit between the portion 28 of the fastener assembly 10 and the work piece 50.

Although the illustrated embodiments show the head 30 as being tapered or countersunk, one skilled in the art will understand and appreciate the head 30 can be flat, keyed or ribbed for extra torque out resistance with the work piece 50, or may be omitted. In this latter embodiment, the installation tool includes structure to temporarily restrain the axial movement of the fastener assembly 10 during installation and during the subsequent act of forcing the larger mandrel through the passage 22 to radially expand the radially expandable portion 28 of the receiving member 12.

In one embodiment, a hardened material is used for the receiving member 12 while the collapsible portion 26 is a softer material, which permits the portion 26 to collapse with the applied force generated by the installation tool discussed above. A process such as induction coil annealing, or an equivalent process can be employed to soften the collapsible portion 26.

FIG. 4 shows that the radial expansion causes portion 28 to elastically and plastically deform, thus permanently deforming the portion 28 and creating a high interference fit between the fastener assembly 10 and the work piece 50. The high interference fit keeps the fastener assembly 10 torsionally static with respect to the work piece 50 when a bolt or screw is threaded into the fastener assembly 10. When the installation process is complete, the fastener assembly 10 is substantially fixed in the work piece 50 in both an axial and rotational (e.g., torsional) direction.

The radial expansion process may also advantageously cause the cold working of the material of the work piece 50 located adjacent to the opening in the work piece 50. The amount of cold working, which may cause some amount of radial deformation of the work piece 50, is primarily dependent on the relative modulus (hardness) of the fastener material compared to the modulus of the work piece material as well as the size of the gap 56 (FIG. 3), the elastic properties of the receiving member 12 material, the size of the mandrel relative to the size of the passage 22, and other variables. Radially expanding the portion 28 may induce residual compressive stresses in the adjacent region of the work piece 50. The combination of the high interference fit of the expanded receiving member 12 into the work piece 50 and any residual compressive stresses that may have been developed in the work piece 50 can enhance the fatigue life of the work piece 50 and inhibit crack growth in the effected region.

The fastener assembly 10 can provide a structural mounting location for attaching accessory devices. In one embodiment, the fastener assembly 10 is used to attach a fuel pump to the wall of a fuel tank. When the fastener assembly 10 is used in the fuel tank environment, both the cap 14 and a segment of the receiving member 12 are located on the blind side 52 of the work piece 50 and exposed to fuel. The high interference fit between the receiving member 12 and the work piece 50 as well as the secure fit between the cap 14 and the receiving member 12 are sufficient to make the installed fastener assembly 10 substantially leak proof or leak resistant, even if a positive pressure exists within the fuel tank (i.e., the positive pressure would tend to force the fuel through any available crevice).

One advantage of the fastener assembly 10 is that the cap 14 is assembled with the receiving member 12 after the threads 24 have been machined. Therefore, the threads 24 can be thoroughly cleaned and inspected. This reduces the cost of the receiving member 12 while also insuring that the receiving members 12 are manufactured with high quality, reliable internal threads. In addition, the cap 14 is easy to install onto the receiving member 12, thus realizing an inexpensive fastener assembly 10. The fastener assembly 10 is leak resistant, maintains the benefits of having a collapsible second flange 27, can be secured to the work piece 50 by being radially expanded within the opening in the work piece 50, and can be installed quickly.

Another advantage of the fastener assembly 10 is that the overall weight of the two-piece assembly is actually less than the conventional one-piece blind fastener assembly. Reducing the weight of a fastener assembly in an aerospace vehicle, even by portions of an ounce, can have a significant impact because fastener assemblies are often installed in a multitude of locations throughout the vehicle.

The various embodiments described above can be combined to provide further embodiments. All of the above U.S. patents, patent applications and publications referred to in this specification as well as U.S. Pat. No. 6,487,767 issued to Reid et al. on Dec. 3, 2002 are incorporated herein by reference. Aspects of the invention can be modified, if necessary, to employ devices, features, and concepts of the various patents, applications and publications to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all fastener assemblies and sealing devices used in conjunction with fastener assemblies that operate in accordance with the claims. Accordingly, the invention is not limited by the disclosure, but instead its scope is to be determined entirely by the following claims.

What is claimed is:

1. A system of an aircraft, the system comprising:
a fuel tank configured to hold highly pressurized fuel; and
a blind fastener assembly sealably coupled to the fuel tank, the blind fastener assembly comprising:
a receiving member extending through a wall of the fuel tank, the receiving member having a body with a first end and a second end opposed to the first end, the body having a first outer perimeter and a second outer perimeter smaller than the first outer perimeter, the body having an opening extending between the first end and the second end and an engageable structure formed therein, at least a portion of the body has been collapsed to form a flange, at least a portion of the body with at least a first outer perimeter has undergone an amount of plastic, radial expansion;
a cap positioned in the fuel tank, the cap having an open end and a closed end connected with a thin-walled body, a first portion of the cap having at least a first inner perimeter closely received by the second outer perimeter of the body of the receiving member, the cap forming a secure fit with the body of the receiving member; and
a leak resistant seal between the cap and the receiving member, the leak resistant seal prevents highly pressurized fuel in the fuel tank from flowing therethrough when the aircraft is in service.

2. The system of claim 1, further comprising:
a bonding substance applied at an interface of the first inner perimeter of the cap and the second outer perimeter of the fastener assembly.

3. The system of claim 1 wherein the first inner perimeter forms an interference fit with the second outer perimeter of the body.

4. The system of claim 1 wherein the plastic, radial expansion of the first outer perimeter of the fastener assembly creates an interference fit between the fastener assembly and a work piece.

5. The system of claim 1 wherein the engageable structure formed within the body is an internally threaded section.

6. The system of claim 1 wherein the body has a cylindrical cross-section.

7. The system of claim 1, further comprising:
a shoulder forming a transition between the first outer perimeter and the second outer perimeter of the fastener assembly.

8. The system of claim 7 wherein a distance of about 0.0200 inches is provided between the shoulder and the open end of the cap.

9. The system of claim 1 wherein the flange is spaced apart from a fastener assembly head formed on the body by at least a thickness of the wall of the fuel tank.

10. The system of claim 1, further comprising:
a head formed on the body of the receiving member, the head seated against an accessible side of the fuel tank.

11. The system of claim 1 wherein the first perimeter of the receiving member and an outer perimeter of the thin-walled body of the cap are substantially, dimensionally equivalent.

12. The system of claim 1 wherein an outer perimeter of the thin-walled body of the cap is smaller than the first perimeter of the receiving member.

13. The system of claim 1 wherein the body of the receiving member includes a reduced wall thickness section, the reduced wall thickness section being the portion of the body that has been collapsed to form the flange.

14. The system of claim 1 wherein the body of the receiving member includes a reduced strength portion, the reduced strength portion being the portion of the body that has been collapsed to form the flange.

15. The system of claim 1, further comprising:
a bolt received in the receiving member of the fastener assembly.

16. The system of claim 1, wherein the leak resistant seal is formed by an inner surface of the cap and an outer surface of the receiving member.

17. The system of claim 1, further comprising:
a fuel pump coupled to the wall of the fuel tank via the blind fastener assembly.

18. A fastener assembly installed in a hole in a work piece having a blind side and an accessible side, the fastener assembly comprising:
   a body having a first end and a second end opposed to the first end, a passage extending through the body, the passage forming an opening at the first end and an opening at the second end of the body, the body having a first section and a second section between the first end and the second end, the first section being generally located between the first end and the second section and having a first outer perimeter, the second section being generally located between the first section and the second end and having a second outer perimeter, the second outer perimeter being smaller than the first outer perimeter, the body further having a collapsible wall portion spaced from the first end by a distance approximately equal to at least a thickness of a work piece into which the fastener assembly is to be mounted; and
   a cap having a first end and a second end, opposed to the first end, the cap having an opening formed at the first end and being closed at the second end, an inner perimeter of the opening being sized to be closely received by the second outer perimeter of the body such that, after the collapsible wall portion has been collapsed and a portion of the body has been radially expanded to form an interference fit with the work piece, a fluid-tight, leak resistant seal exists between the cap and the body, the fluid-tight, leak resistant seal is positioned on the blind side of the work piece and prevents pressurized fluid on the blind side of the work piece from flowing between the cap and the body to the accessible side of the work piece.

19. The fastener assembly of claim 18, further comprising:
   a bonding substance applied at an interface of the inner perimeter of the cap and the second outer perimeter of the body.

20. The fastener assembly of claim 18 wherein the portion of the body that has been radially expanded to form the interference fit with the work piece includes a sufficiently malleable portion of the body formed proximate to the collapsible wall portion of the body, the malleable portion being radially expandable into the work piece to create the interference fit between the body and the work piece.

21. The fastener assembly of claim 18 wherein the body has a cylindrical cross-section.

22. The fastener assembly of claim 18, further comprising:
   a head formed on the body, the head seated against the accessible side of the work piece.

23. The fastener assembly of claim 18 wherein an outer perimeter of the cap is approximately equal to or less than the first outer perimeter of the body.

24. The fastener assembly of claim 18 wherein an outer perimeter of the cap is smaller than the first outer perimeter of the body.

25. The fastener assembly of claim 18 wherein the collapsible wall portion of the body includes a reduced wall thickness section.

26. The fastener assembly of claim 18 wherein the collapsible wall portion of the body includes a reduced strength section.

27. The fastener assembly of claim 18, further comprising:
   a bolt received in the body of the fastener assembly.

28. A fastener assembly for installation in an opening in a wall of a fuel tank of an aircraft, the fastener assembly comprising:
   a receiving member having a body with a first end and a second end opposed to the first end, the body having an opening extending between the first end and the second end, at least a portion of the body configured to move from a first configuration for insertion into the opening to a second expanded configuration, at least a portion of the body configured to form a flange for engaging the wall;
   a cap having an open end and a closed end connected with a cap body, the cap configured to be received by the second end of the body, the cap dimensioned to pass through the opening in the wall of the fuel tank when the cap is coupled to the second end of the body; and
   a leak resistant seal formed by the cap and the body, the seal adapted to prevent pressurized fuel in the fuel tank during flight of the aircraft from flowing thereby when the cap is positioned inside the fuel tank of the aircraft, the portion of the body has formed a flange, and the portion of the body is in the second expanded configuration so as to form an interference fit with the wall of the fuel tank.

* * * * *